United States Patent [19]
Hollis

[11] 4,034,166
[45] July 5, 1977

[54] TRANSMISSION NETWORKS FOR TELEPHONE SYSTEM

[75] Inventor: John Edward Hollis, High Wycombe, England

[73] Assignee: Plessey Handel und Investments A.G., Zug, Switzerland

[22] Filed: Nov. 25, 1975

[21] Appl. No.: 635,039

[30] Foreign Application Priority Data

Nov. 27, 1974 United Kingdom ............ 51306/74

[52] U.S. Cl. .......................................... 179/170 NC
[51] Int. Cl.² ........................................... H04B 1/58
[58] Field of Search ..... 179/170 R, 170 T, 170 NC

[56] References Cited
UNITED STATES PATENTS 3,973,089    8/1976    Puckette ..................... 179/170 NC

*Primary Examiner*—Kathleen H. Claffy
*Assistant Examiner*—Randall P. Myers
*Attorney, Agent, or Firm*—Fleit & Jacobson

[57] ABSTRACT

Intended to give cost, size and possibly performance advantage over a conventional hybrid transformer arrangement, by using operational amplifiers with semiconductors. Typically the input and output at the 4-wire side are each unbalanced, and the 4-wire side input path involves a line driver comprising driver amplifiers for each conductor of the balanced 2-wire line. The driver amplifiers are operative over a resistor bridge network extending to the 2-wire line. Another pair of series-connected operational amplifiers constitute a common mode rejection receiver between the 2-wire line and the 4-wire output and are controlled from diagonals of said bridge. It is necessary to provide for cancellation of the coupling between the 4-wire incoming and outgoing paths, and this is effected by using a signal from the output of the inverting amplifier for disablement of the receiver.

2 Claims, 1 Drawing Figure

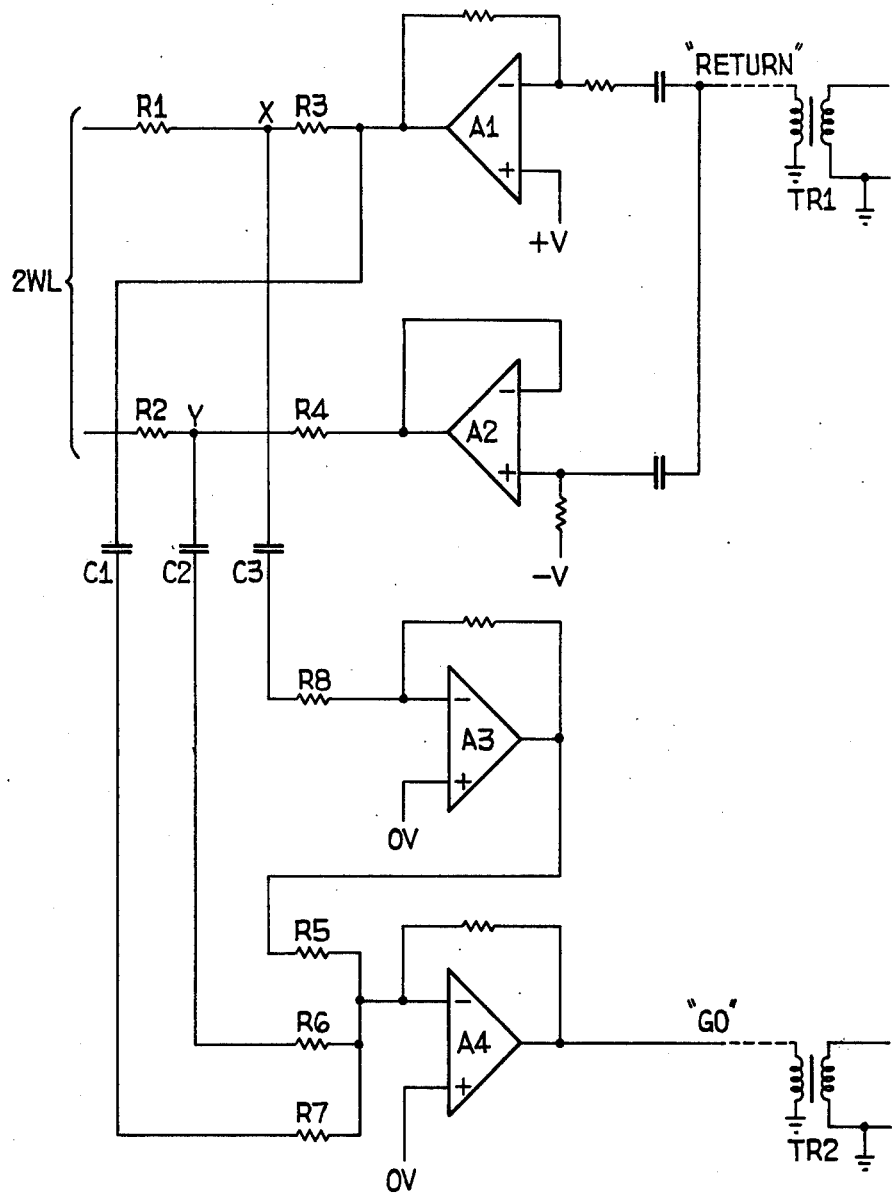

TRANSMISSION NETWORKS FOR TELEPHONE SYSTEM

The present invention relates to transmission networks for use in telephone systems and is more particularly concerned with terminating sets for the coupling of "go" and "return" speech channels to a 2-wire speech circuit.

The use of hybrid transformers in 2-wire to 4-wire terminating sets is well known. Considerable care is taken in their design and manufacture to meet a high standard of operation requirements; one such requirement being that coupling between the "return" and "go" channels should be minimal. Although improvements in materials and techniques may have led to some reduction in the size of hybrid transformers, it is still considered that in some instances the bulk, weight and shape of a terminating unit using such a transformer presents mounting problems.

The minaturisation of electronic functional units by the advent of integrated circuit techniques enables a reappraisal of the composition of terminating sets to be made and the object of the present invention is to provide an efficient electronic terminating set which can be fabricated in slim and compact form by the use of integrated circuit techniques.

According to the invention there is provided a terminating set of the kind providing for the coupling of "go" and "return" speech channels to a 2-wire speech circuit, characterised in that the "go" and "return" paths each including a separate pair of operation amplifiers are coupled with the 2-wire speech circuit over a resistor network, and a signal path is provided between the output of an amplifier of said "return" path and an input of one of the amplifiers of said "go" path which is operative in the presence of speech currents in the "return" path to effect substantial cancellation of the coupling of those currents to the "go" path.

The invention will be better understood from one method of carrying it into effect which should be read in conjunction with the drawing accompanying the provisional specification.

The proposed terminating set shown in the drawing, serves a balanced 2-wire line 2WL and "GO" and "RETURN" paths whch are unbalanced with respect to earth although the circuit may be readily adapted for use with balanced pairs for the two last-mentioned paths. However in the present instance transformers TR1 and TR2 are included in the "RETURN" and "GO" paths respectively.

The balanced two-wire line 2WL is connected to one side of the network comprising the resistors R1, R2, R3 and R4, having values such that their total value is substantially equal to the line-termination resistance, and, for the purpose of symmetry R1 = R2 and R3 = R4. The operational amplifiers A1, A2, A3 and A4, may be fabricated as a composite integrated circuit "chip". Amplifiers A1 and A2 having relative gain characteristics which depend on whether a channel gain of loss is required, have inputs which are capacitively coupled to the earthed secondary winding of transformer TR1. Amplifier A1 produces inversion of signals forthcoming over the "RETURN" path, whereas amplifier A2 produces a non-inverted output; the amplifiers producing corresponding effects at points X and Y of the resistor network. The states of points X and Y are also controlled by any speech signals emanating from the 2-wire line. Amplifier A1 and A2 are suitably biased from stabilized positive and negative supply sources +V and −V respectively, which may also serve to energize the 2-wire line, whereas amplifier A3 and A4 are biased in the intermediate condition of zero volts (0 V).

The inverting amplifiers A3 and A4 of the "GO" path, arranged to provide high common-mode signal rejection, are serially connected by resistor R5. The input to amplifier A3 is derived from point X over capacitor C3 and resistor R8, whereas the output of amplifier A4 is connected to the line coupling transformer TR2 of the "GO" path. Point Y of the resistor network extends over capacitor C2 and resistor R6 to the signal input of amplifier A4.

Typically amplifier A3 has a gain of 0.1 with respect to inputs over resistor R9, and amplifier A4 (via input resistor R5) has a gain of 10 to give a through gain of unity which is matched by the unit gain of amplifier A4 via resistor R6. In these circumstances speech signals would have a gain of unity, whereas, and common-mode input signals at the 2-wire line 2WL hundreds of volts are obviated from the output of amplifier A4 because amplifier saturation should not occur.

Amplifier A4, besides being controlled over resistors R5 and R6, is controlled over resistor R7 by signals extended directly over capacitor C1 from the output of the "RETURN"-path inverting amplifier A1. When speech signals are present in the "RETURN"-path the resultant in-phase signals applied to amplifier A4 over resistors R5 and R6 are cancelled by the anti-phase signal applied over resistor R7. The latter is preferably adjustable to allow for setting to a value which will compensate for component and other possible tolerances.

In the particular arrangement, the amplifiers A1 and A2 are biased by positive and negative potentials respectively (in relation to earth) so that power is available for a telephone or other equipment connected to the 2-wire line. If such line-energising potentials are not so provided, capacitors C1, C2 and C3 provided for d.c. blocking purposes would be omitted and zero (i.e. earth) bias potentials employed at the two amplifiers.

In the event of amplifiers A1 and A2 not having sufficient driving capability (or power capability for line equipment) each may be provided with a transistorised power-output stage. This may give the advantage of a lower output impedance.

To adapt the terminating set to the situation where the "GO" and "RETURN" paths each constituted by a pair of conductors, amplifiers A1 and A2 would be controlled individually from the two conductors of the "RETURN" path and both amplifiers would be either of the inverting or non-inverting form to function merely as buffer units. Furthermore as regards the "GO" path according to one form of the terminating set amplifier A4 would be of a form giving a balanced output, or the original amplifier A4 may be used in conjunction with an additional amplifier (inverting with respect to amplifier A4). In the last-mentioned interpretation, amplifier A4 and said additional amplifier would be connected to different wires of the 2-wire "GO" path.

What we claim is:

1. A terminating set of the kind providing for the coupling of go and return speech paths to a 2-wire speech circuit characterised in that, a. the return path includes a first and a second operational amplifier and the go path includes a third and a fourth operational amplifier, said third and fourth amplifiers have preselected gains,
b. said first and second amplifiers extend return path balanced speech currents to said 2-wire speech circuit over a resistor network comprising first and second identical branches each having an identical internal tapping point,
c. the tapping point of said first branch is connected over a first capacitor to the input path of said third amplifier,
d. the tapping point of the second branch is connected over a second capacitor and a first input resistor to said fourth amplifier,
e. the output path of said third amplifier is connected over a second input resistor to said fourth amplifier,
f. the output path of the first amplifier is connected over a third capacitor and a third input resistor to said fourth amplifier, and wherein said preselected gains of the third and fourth amplifiers is such that balanced speech currents derived from the 2-wire line are extended to the go path whereas common-mode voltage conditions at said tapping points are substantially rejected and not applied to the go path.

2. A terminating set as claimed in claim 1 wherein when the return path speech signals are present at the output of said first amplifier said fourth amplifier is operative over said third resistor to substantially prevent the connection of return path speech signals to the go path.

* * * * *